US012007613B2

(12) United States Patent
Chen et al.

(10) Patent No.: US 12,007,613 B2
(45) Date of Patent: Jun. 11, 2024

(54) OPTICAL TRANSCEIVING DEVICE AND RELEASE MECHANISM THEREOF

(71) Applicant: Global Technology Inc., Ningbo (CN)

(72) Inventors: Kejun Chen, Ningbo (CN); Taotao Ye, Ningbo (CN); Gaofei Yao, Ningbo (CN); Qilin Hong, Ningbo (CN)

(73) Assignee: Global Technology Inc., Ningbo (CN)

( * ) Notice: Subject to any disclaimer, the term of this patent is extended or adjusted under 35 U.S.C. 154(b) by 374 days.

(21) Appl. No.: 17/667,852

(22) Filed: Feb. 9, 2022

(65) Prior Publication Data
US 2023/0089633 A1    Mar. 23, 2023

(51) Int. Cl.
*G02B 6/42* (2006.01)
*H01R 13/633* (2006.01)

(52) U.S. Cl.
CPC ......... *G02B 6/4278* (2013.01); *G02B 6/4246* (2013.01); *H01R 13/6335* (2013.01)

(58) Field of Classification Search
CPC . G02B 6/4278; G02B 6/4246; H01R 13/6335
USPC ........................................................ 439/484
See application file for complete search history.

(56) References Cited

U.S. PATENT DOCUMENTS

| 6,494,623 | B1* | 12/2002 | Ahrens | G02B 6/4292 |
| | | | | 439/372 |
| 6,731,510 | B1* | 5/2004 | Hwang | H01R 13/6275 |
| | | | | 361/728 |
| 7,077,578 | B2* | 7/2006 | Lee | G06F 1/1632 |
| | | | | 385/88 |
| 7,513,693 | B2* | 4/2009 | Wang | G02B 6/4284 |
| | | | | 385/56 |
| 8,794,848 | B2* | 8/2014 | Sasaki | G02B 6/4261 |
| | | | | 385/53 |
| 10,288,824 | B2* | 5/2019 | Lin | G02B 6/4261 |
| 10,534,144 | B1* | 1/2020 | Chen | G02B 6/4261 |
| 10,578,818 | B1* | 3/2020 | Chen | G02B 6/4284 |
| 10,606,001 | B1* | 3/2020 | Ko | G02B 6/4246 |
| 10,812,193 | B2* | 10/2020 | Matsui | H04B 10/40 |
| 2003/0044129 | A1* | 3/2003 | Ahrens | G02B 6/3897 |
| | | | | 385/92 |

(Continued)

FOREIGN PATENT DOCUMENTS

| DE | 102010055434 B3 * | 4/2012 | ......... G02B 6/4246 |
| JP | 5893828 B2 * | 3/2016 | ......... G02B 6/4246 |

*Primary Examiner* — Peter G Leigh
(74) *Attorney, Agent, or Firm* — Grossman Tucker Perreault & Pfleger, PLLC

(57) ABSTRACT

An optical transceiving device includes a housing including opposite lateral surfaces, a fastening component movably disposed on the housing, and a bail assembly including a carrier, a handle and a securing structure. The fastening component includes a linkage arm and two extending arms connected with the linkage arm. The two extending arms configured to be detachably fastened with a cage. The carrier is fixed to the fastening component. The carrier and the linkage arm jointly define an accommodation space having an opening. The handle is disposed on the carrier and movable along a release direction to be at either a close position or an open position. The handle is held in the accommodation space by the securing structure when at the close position. The handle protrudes from the opening when at the open position, and brings the fastening component to move together.

15 Claims, 15 Drawing Sheets

(56) References Cited

U.S. PATENT DOCUMENTS

| | | | |
|---|---|---|---|
| 2015/0162709 A1* | 6/2015 | Shen | H01R 13/6272 |
| | | | 439/352 |
| 2017/0254973 A1* | 9/2017 | Yu | G02B 6/4206 |
| 2018/0136415 A1* | 5/2018 | Matsui | G02B 6/3893 |
| 2018/0375254 A1* | 12/2018 | Lu | H01R 13/6275 |
| 2021/0176874 A1* | 6/2021 | Ishii | H05K 7/20454 |

* cited by examiner

OPTICAL TRANSCEIVING DEVICE AND RELEASE MECHANISM THEREOF

CROSS-REFERENCE TO RELATED APPLICATIONS

This non-provisional application claims priority under 35 U.S.C. § 119(a) on Patent Application No(s). 202111105096.4 filed in China on Sep. 22, 2021, the entire contents of which are hereby incorporated by reference.

BACKGROUND

1. Technical Field

The present disclosure relates to optical transmitter/receiver (transceiving) device, more particularly, to a pluggable optical transceiving device and its release mechanism.

2. Related Art

Optical transceivers are generally installed in electronic communication facilities in modern high-speed communication networks. In order to make flexible the design of an electronic communication facility and less burdensome the maintenance of the same, an optical transceiver is inserted in a pluggable fashion into a corresponding cage. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others including QSFP28 and QSFP-DD (double density) at different communication rates have been made available.

Generally, as to an optical transceiving device, such as optical module and optical transceiver, a fastening structure is provided for securely fixing the optical transceiving device to the cage. Thus, a release mechanism is needed to work with the fastening structure for releasing the same optical transceiving device from the cage smoothly when necessary.

SUMMARY

According to one aspect of the present disclosure, an optical transceiving device, configured to be inserted into a cage in a pluggable manner, includes a housing, a fastening component and a bail assembly. The housing includes two lateral surfaces opposite to each other. The fastening component is movably disposed within the housing. The fastening component includes a linkage arm and two extending arms. The two extending arms are respectively connected with opposite sides the linkage arm, respectively. The two extending arms are disposed on the two lateral surfaces, respectively, and the two extending arms are configured to be detachably fastened with the cage. The bail assembly includes a carrier, a handle and a securing structure. The carrier is fixed to the fastening component. The carrier and the linkage arm jointly define an accommodation space having an opening. The handle is disposed above the carrier and movable along a release direction to be at either a close position or an open position, and the securing structure is located in the accommodation space. When the handle is at the close position, a first part of the handle is held in the accommodation space by the securing structure. When the handle is at the open position, a second part of the handle protrudes from the opening of the accommodation space, and the handle brings the fastening component to move along the release direction.

According to another aspect of the present disclosure, a release mechanism for optical transceiving device includes a fastening component and a bail assembly. The bail assembly includes a carrier, a handle and a securing structure. The carrier is fixed to the fastening component. The carrier and the fastening component jointly define an accommodation space having an opening. The handle is disposed above the carrier and movable along a release direction to be at either a close position or an open position, and the securing structure is located in the accommodation space. When the handle is at the close position, a first part of the handle is held in the accommodation space by the securing structure. When the handle is at the opened position, a second part of the handle protrudes from the opening of the accommodation space, and the handle brings the fastening component to move along the release direction.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
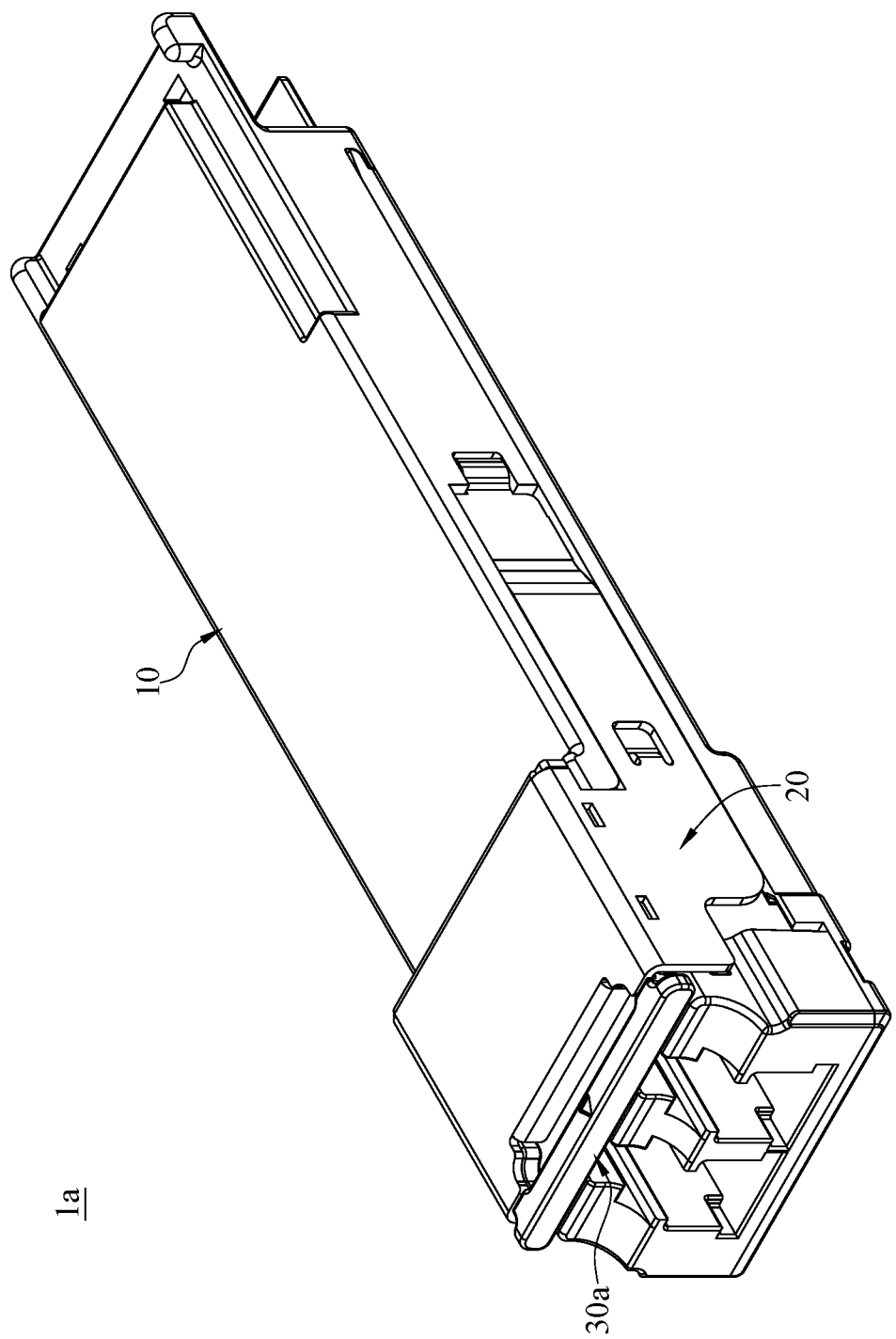
FIG. 1 is a perspective view of an optical transceiving device according to a first embodiment of the present disclosure.
Figure 2:
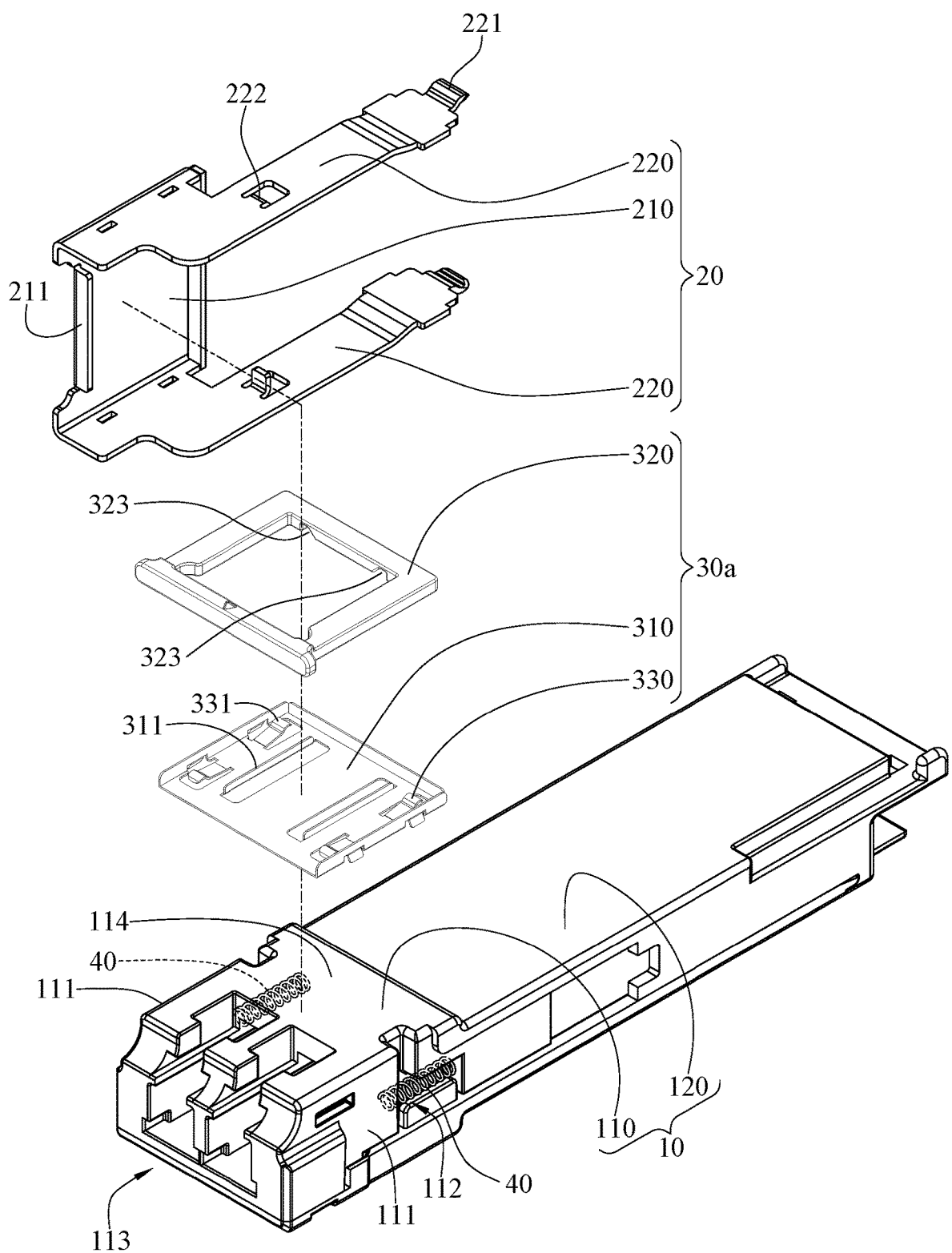
FIG. 2 is an exploded view of the optical transceiving device in FIG. 1.
Figure 3:
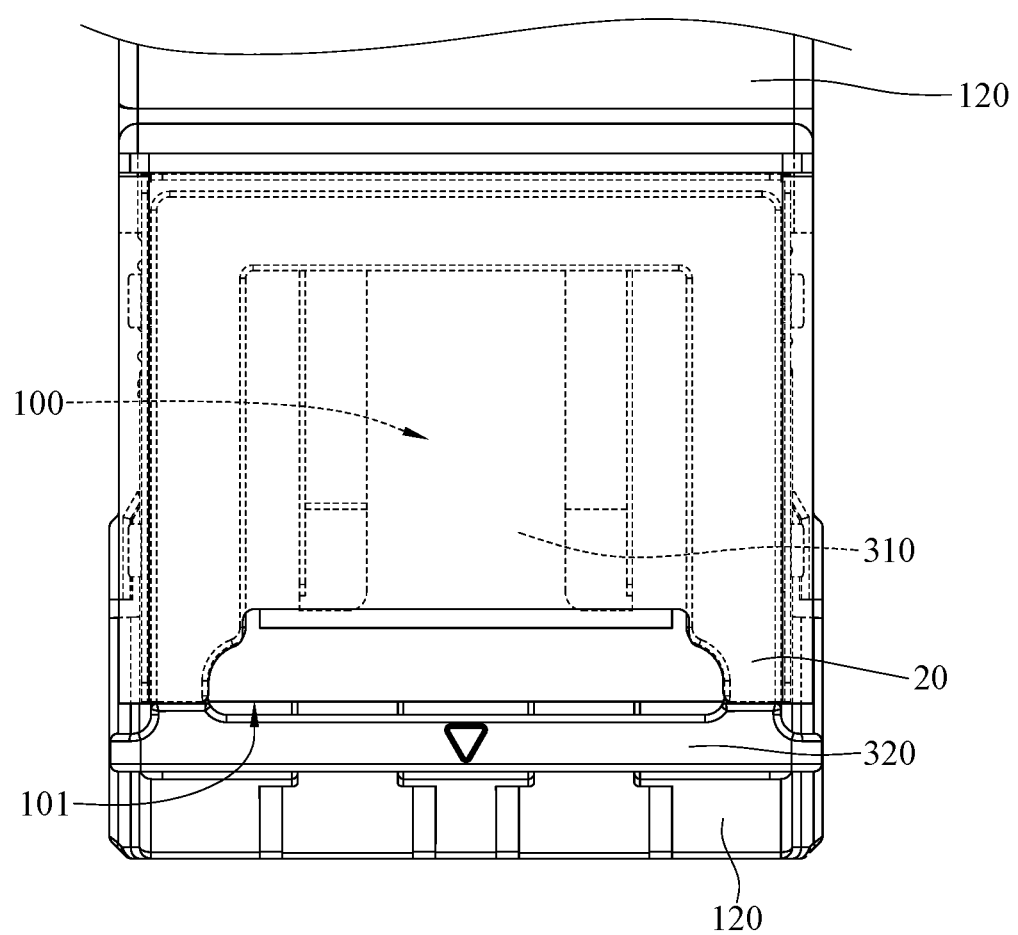
FIG. 3 is a top view of the optical transceiving device in FIG. 1.
Figure 4:
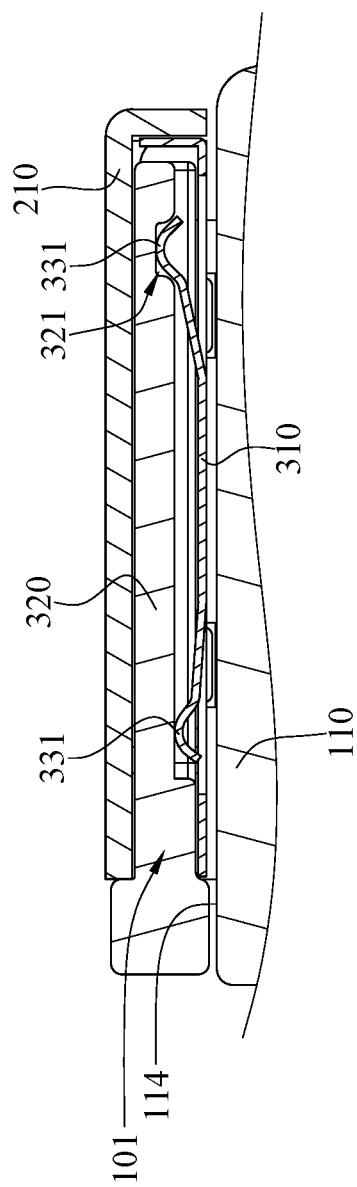
FIG. 4 is a cross-sectional view of the optical transceiving device in FIG. 1.

Please refer to FIG. 1 through FIG. 4. FIG. 1 is a perspective view of an optical transceiving device according to a first embodiment of the present disclosure. FIG. 2 is an exploded view of the optical transceiving device in FIG. 1. FIG. 3 is a top view of the optical transceiving device in FIG. 1. FIG. 4 is a cross-sectional view of the optical transceiving device in FIG. 1. In this embodiment, an optical transceiving device 1a is provided, and the optical transceiving device 1a may include a housing 10, a fastening component 20, a bail assembly 30a and two elastic components 40. The optical transceiving device 1a is, for example but not limited to, a QSFP-DD-based optical module or an optical transceiver.

The housing 10 is, for example but not limited to, a metal housing including a terminal portion 110 and an insertion portion 120 connected with each other. The insertion portion 120 may be configured to be inserted into the corresponding cage (not shown in FIG. 1 through FIG. 4) in a pluggable manner. The terminal portion 110 of the housing 10 may include two lateral surfaces 111 and two grooves 112. The two grooves 112 are formed on respective lateral surfaces 111 to accommodate respective elastic components 40. In this embodiment, the housing 10 may be configured to accommodate optical-electrical convert circuit (not shown in the drawings) and any electrical or optical components required for performing the corresponding optical-electrical conversion. The grooves 112 may not extend through the lateral surface 111 of the housing 10. Moreover, the terminal portion 110 of the housing 10 may also include an optical fiber terminal 113 configured to couple an optical fiber (not shown in the drawings) with the optical-electrical convert circuit inside the housing 10.

The fastening component 20 may include a linkage arm 210 and two extending arms 220. The two extending arms 220 may be connected with opposite sides of the linkage arm 210, respectively. As such, the linkage arm 210 could be between the two extending arms 220. The extending arm 220 may be movably disposed on a sliding rail formed on the lateral surface 111. Each of the extending arms 220 may includes a fastening portion 221 and a confining portion 222 extending into the corresponding groove 112 of the housing 10.

The bail assembly 30a may include a carrier 310, a handle 320 and a securing structure 330. The carrier 310 may be fixed to the fastening component 20, and the carrier 310 and the extending arms 220 may jointly define an accommodation space 100 having an opening 101. The handle 320 may be movably disposed on the carrier 310, and the securing structure 330 may be located in the accommodation space 100. The securing structure 330 may include two fastening structures formed on the carrier 310. Each fastening structure may include two elastic sheets 331 extending towards the handle 320, and the handle 320 includes a recess 321 corresponding to the elastic sheets 331. FIG. 2 through FIG. 4 show that the elastic sheet 331 of the securing structure 330 is a one-piece element. More specifically, the elastic sheet 331 may be a bent metal strip formed on the carrier 310 by stamping, while the present disclosure is not limited by the specific embodiment. The function of the bail assembly 30a will be illustrated hereafter.

The two elastic components 40 may be disposed on the two grooves 112 of the housing 10, respectively. The confining portion 222 may press against the elastic component 40 located in the groove 112. In this embodiment, the number of the grooves 112 and that of the elastic components 40 are only for exemplary illustration, while the present disclosure is not limited by the specific embodiment.

The fastening component 20 can be moved relative to the housing 10 to be fastened with or removed from the cage. More specifically, the elastic component 40 can press the confining portion 222 of the fastening component 20, such that the extending arm 220 of the fastening component 20 can be hooked with a slot on the cage, and thus the optical transceiving device 1a is stably inserted into the cage. When the optical transceiving device 1a is needed to be pulled out, the fastening component 20 can be moved backward with respect to the housing 10 by the bail assembly 30a, so as to unhook the extending arm 220 from the slot on the cage.

Figure 5:
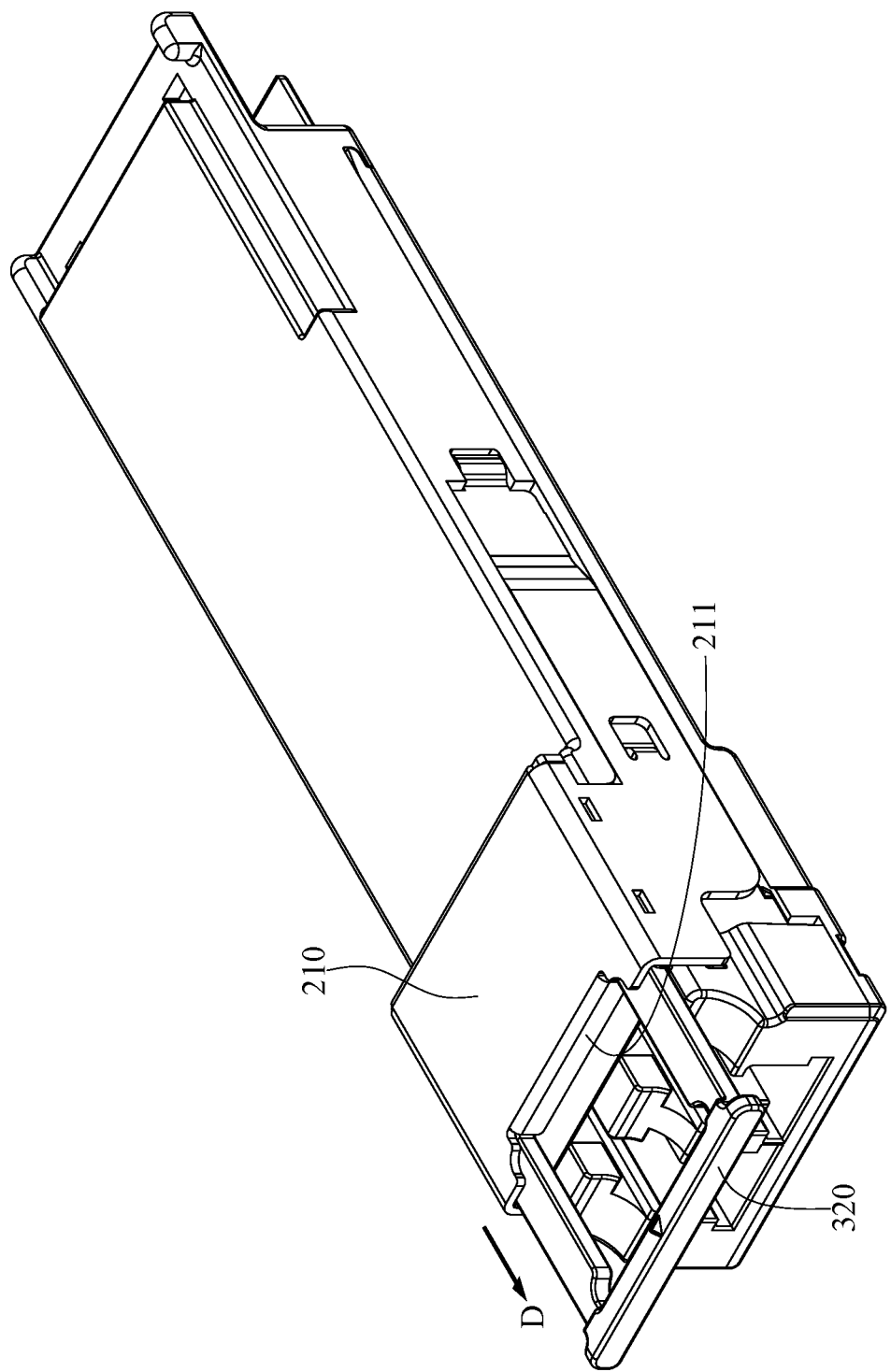
FIG. 5 is a perspective view of the optical transceiving device in FIG. 1, with a handle at opened position.
Figure 6:
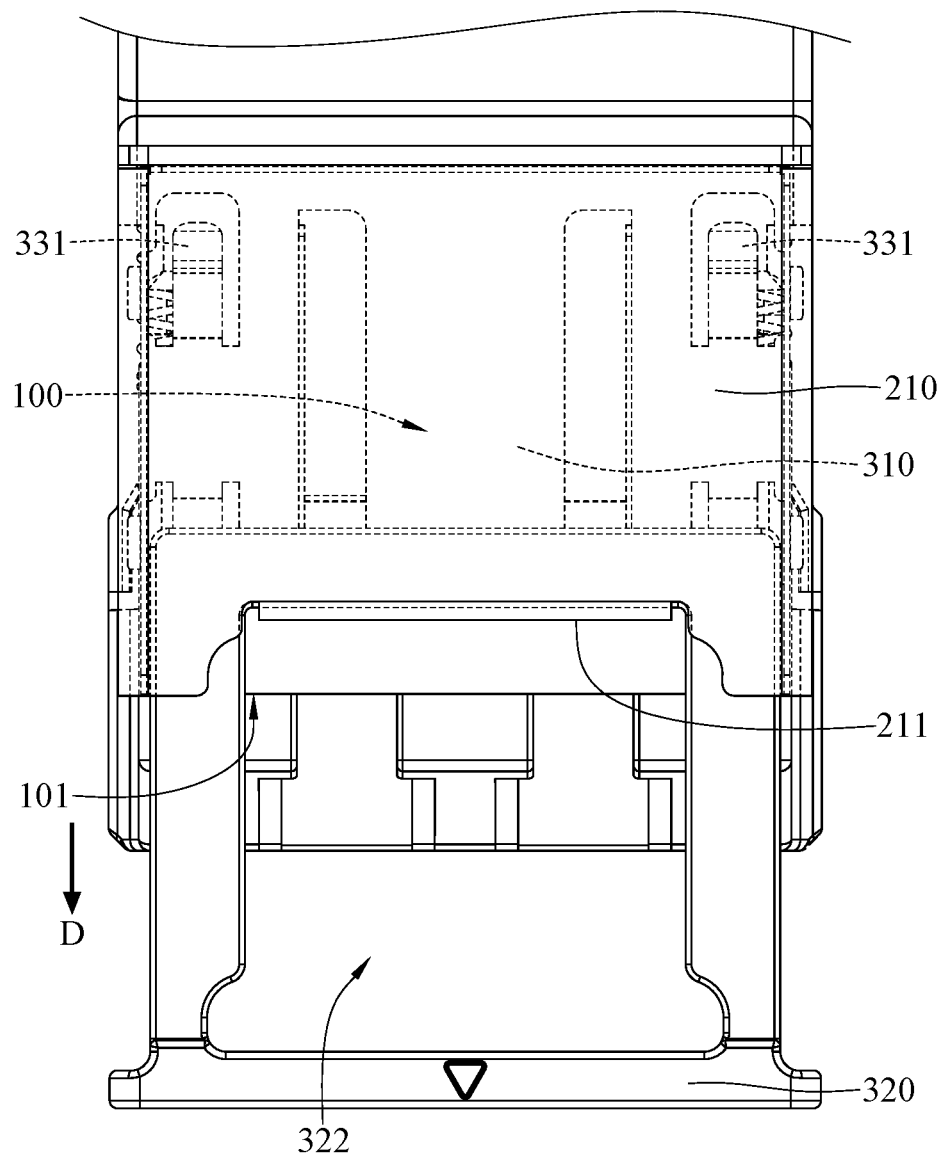
FIG. 6 is a partially top view of the optical transceiving device in FIG. 5.
Figure 7:
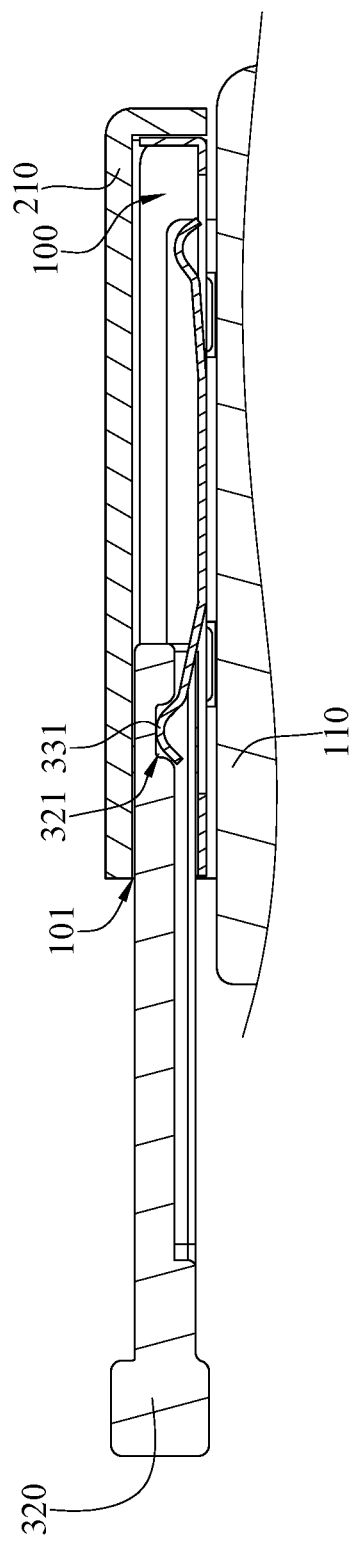
FIG. 7 is a partially cross-sectional view of the optical transceiving device in FIG. 5.

An operator can perform the insertion of the optical transceiving device 1a in pluggable manner by the bail assembly 30a. Please further refer to FIG. 5 through FIG. 7, FIG. 5 is a perspective view of the optical transceiving device in FIG. 1, FIG. 6 is a partially top view of the optical transceiving device in FIG. 5, and FIG. 7 is a partially cross-sectional view of the optical transceiving device in FIG. 5. The fastening component 20 and the bail assembly 30a may jointly constitute a release mechanism of the optical transceiving device 1a. The handle 320 can be moved relative to the fastening component 20 and the carrier 310 along a release direction to be at either a "close" position or an "open" position.

As shown in FIG. 1, FIG. 3 and FIG. 4, at the "close" position, at least part of the handle 320 is held in the accommodation space 100 by the securing structure 330. More specifically, one elastic sheet 331 away from the opening 101 may be hooked with the recess 321 of the handle 320, such that the handle 320 is mostly located in the accommodation space 100, and only a small part of the handle 320 protrudes from the opening 101. The operator can draw that small part of the handle 320 protruding from the opening 101 to unhook the elastic sheet 331 from the recess 321.

As shown in FIG. 5 through FIG. 7, at the "open" position, a most part of the handle 320, which is in the accommodation space 100 at the "close" position, protrudes from the opening 101. Moreover, another elastic sheet 331 close to the opening 101 may be hooked with the recess 321 of the handle 320 to hold the handle 320 at specific position. The linkage arm 210 of the fastening component 20 may include a pressed portion 211 located at the opening 101 of the accommodation space 100, and the handle 320 may constantly abut against the pressed portion 211 of the linkage arm 210. Since the primary part of the handle 320 protrudes out of the opening 101, the operator can pull the handle 320 to apply the corresponding force to the pressed portion 211, thus enabling the fastening component 20 to move together along the release direction D.

Figure 8:
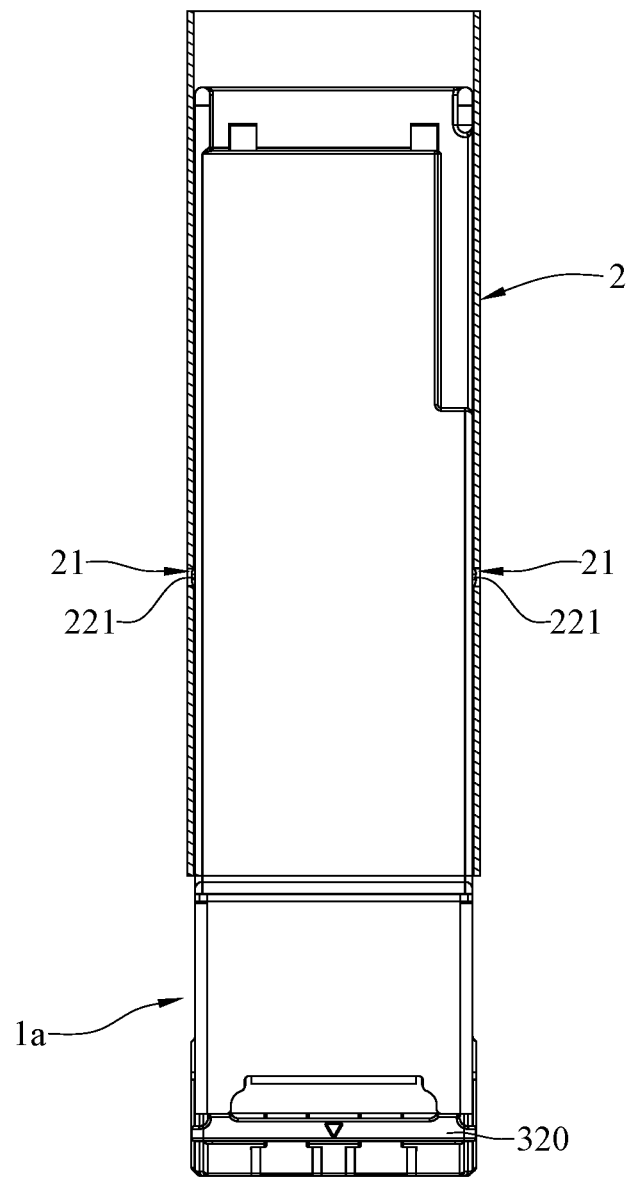
FIG. 8 is a schematic view of a cage where the optical transceiving device is inserted according to the first embodiment of the present disclosure.
Figure 9:
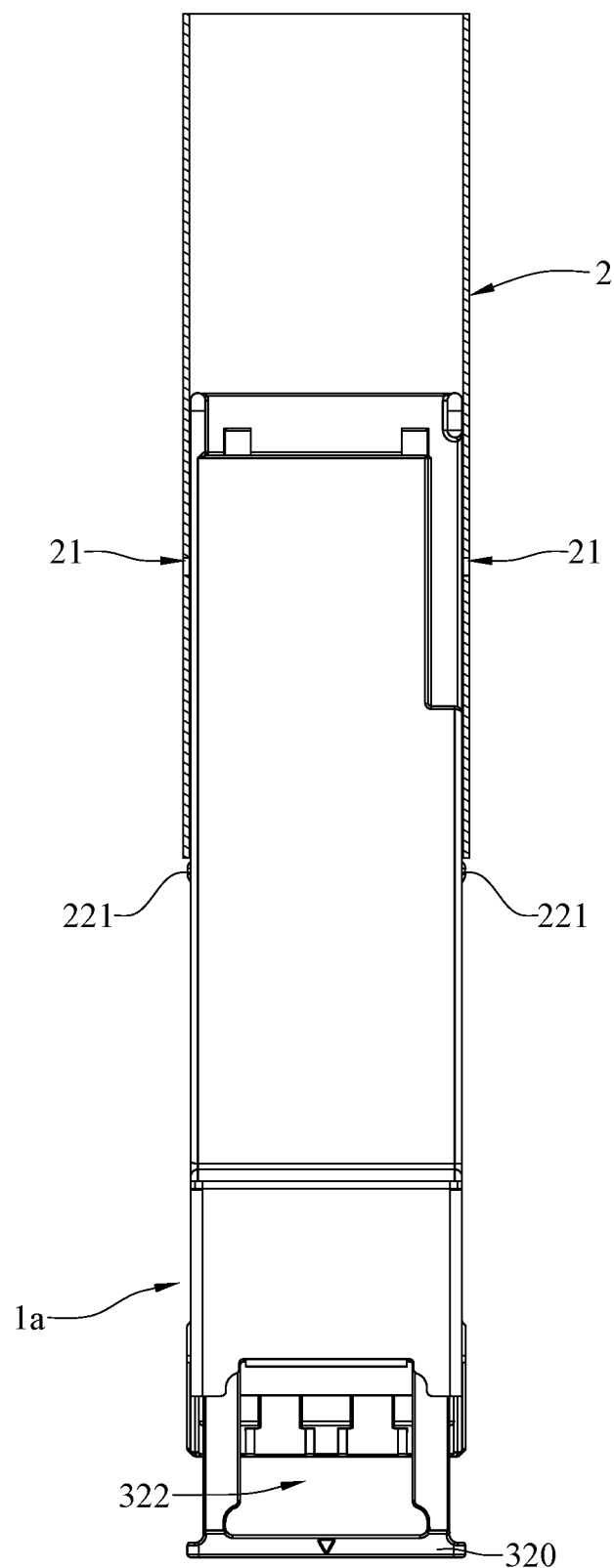
FIG. 9 is a schematic view of the cage from which the optical transceiving device in FIG. 8 is removed.

FIG. 8 is a schematic view of a cage where the optical transceiving device is inserted according to the first embodiment of the present disclosure. FIG. 9 is a schematic view of the cage from which the optical transceiving device in FIG. 8 is removed. In FIG. 8, the optical transceiving device 1a is inserted in a cage 2, and the fastening portion 221 of the fastening component 20 is hooked with the slot 21 on the cage 2 to firmly hold the optical transceiving device 1a in the cage 2. The handle 320 is located in the accommodation space 100, and the interaction between the elastic sheet 331 and the recess 321 could help maintain the handle 320 at the "close" position (as depicted in FIG. 3 and FIG. 4).

In FIG. 9, when the operator would like to draw the optical transceiving device 1a, the handle 320 can be pulled along the release direction D to move the handle 320 to the "open" position. The interaction between the elastic sheet 331 and the recess 321 could help maintain the handle 320 at the "open" position (as depicted in FIG. 5 and FIG. 6). Under this condition, the operator use an aperture 322 of the handle 320 to further pull the handle 320, and the handle 320 is pulled to press against the pressed portion 211 of the fastening component 20, thereby bringing the fastening component 20 to move along the release direction D with respect to the housing 10. When the fastening component 20 is moved along the release direction D, the fastening portion 221 is unhooked from the slot 21 of the cage 2, such that the operator can move at least part of the optical transceiving device 1a out of the cage 2. When the operator releases the handle 320, the elastic potential energy stored in the elastic component 40 could be utilized to press the confining portion 222 of the fastening component 20, thereby moving the fastening component 20 back to its original position and therefore allowing for the insertion of the optical transceiving device 1a into the cage 2. The operator may further push the handle 320 back to the "close" position as shown in FIG. 3 and FIG. 4 so that the handle 320 could be located within the accommodation space 100.

Referring to FIG. 2 and FIG. 4, in this embodiment, the linkage arm 210 of the fastening component 20 may correspond to a top surface 114 of the terminal portion 110 of the housing 10; that is, at least part the linkage arm 210 may be positioned at one side of the housing 10 where the top surface 114 faces toward the linkage arm 210. The carrier 310 of the bail assembly 30a may be located below the linkage arm 210. In other words, the bail assembly 30a may be between the linkage arm 210 and the top surface 114. The present disclosure is not limited by the specific embodiment. In some other embodiments, the linkage arm of the fastening component and the bail assembly may be located below the housing to both correspond to the bottom surface of the housing.

Referring to FIG. 2, FIG. 4 and FIG. 7, in this embodiment, the carrier 310 of the bail assembly 30a may include a guiding rail 311, and the handle 320 may include a confining groove 323 towards the carrier 310. The guiding rail 311 is, for example but not limited to, a metal bump or a metal strip formed on the carrier 310 by stamping and corresponding to the confining groove 323. When the handle 320 is moved from the "close" position in FIG. 4 to the "open" position in FIG. 7, the interaction between the confining groove 323 and the guiding rail 311 can restrict the movement of the handle 320 in a direction orthogonal to the release direction D, so as to minimize unfavorable influence on the ongoing signal transmission of the optical communication which may be caused by the handle 320 being excessively pulled.

Referring to FIG. 5 and FIG. 6, in this embodiment, when the handle 320 is at the "open" position the aperture 322 of the handle 320 has an area exposed to outside, and the area is greater than or equal to 144 mm². In other words, the handle 320 when in its "open" position might take advantage of that area allowing for the operator to pull the handle 320 smoothly.

Figure 10:
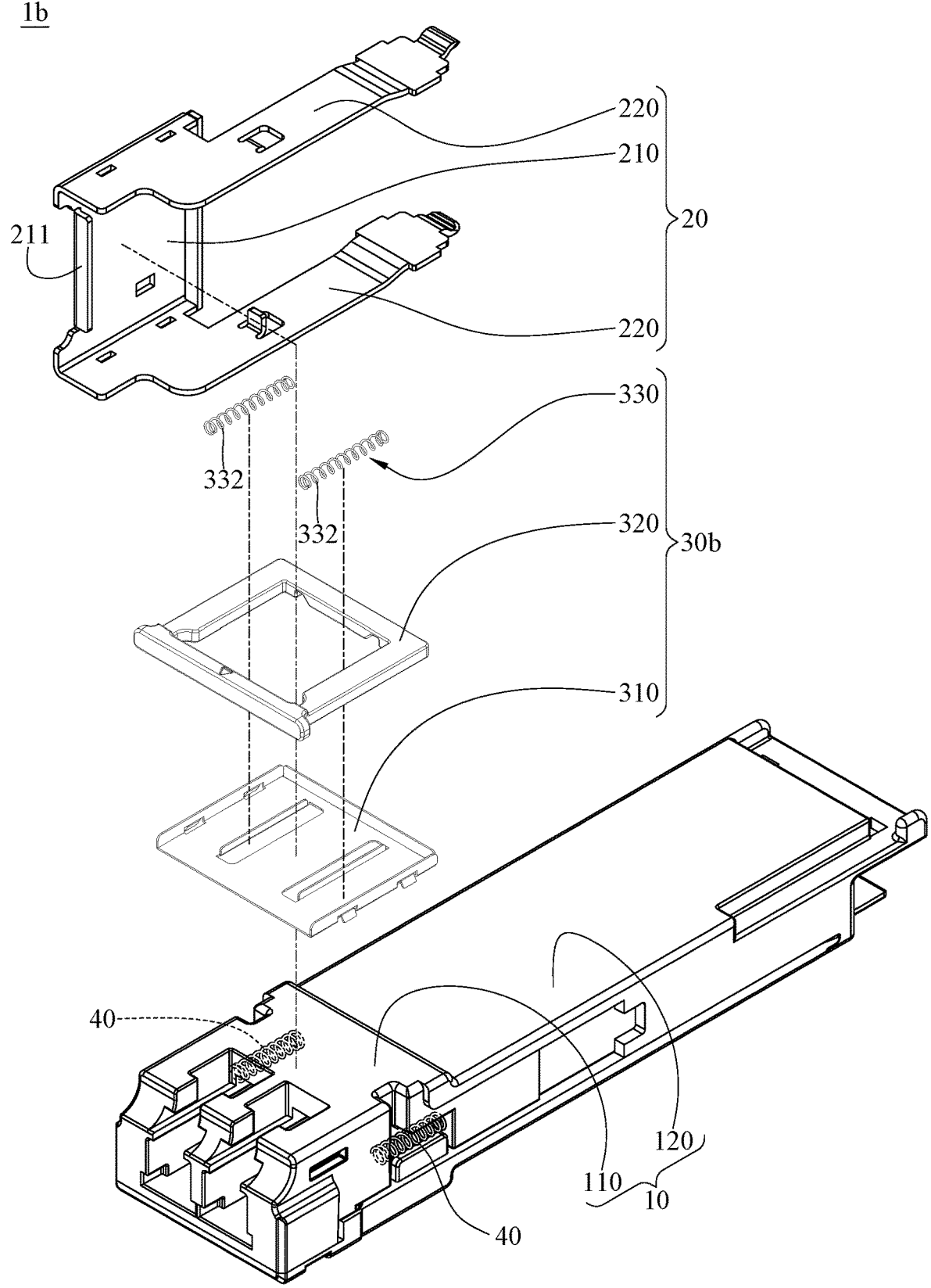
FIG. 10 is an exploded view of an optical transceiving device according to a second embodiment of the present disclosure.
Figure 11:
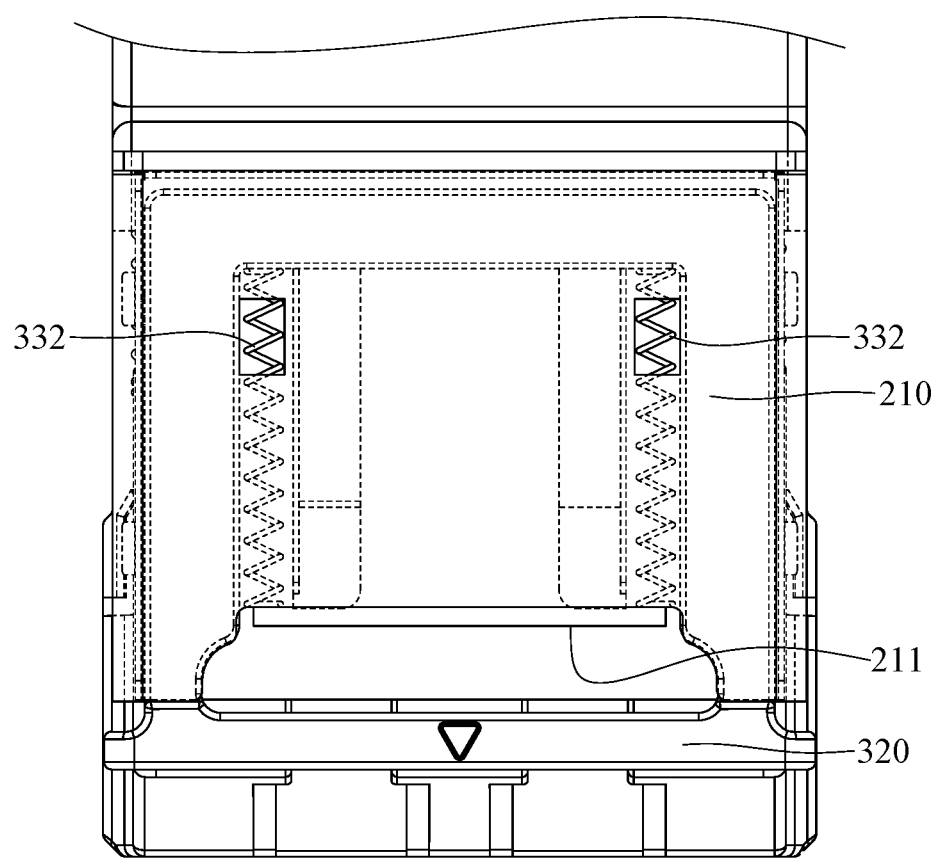
FIG. 11 is a partially top view of the optical transceiving device in FIG. 10.
Figure 12:
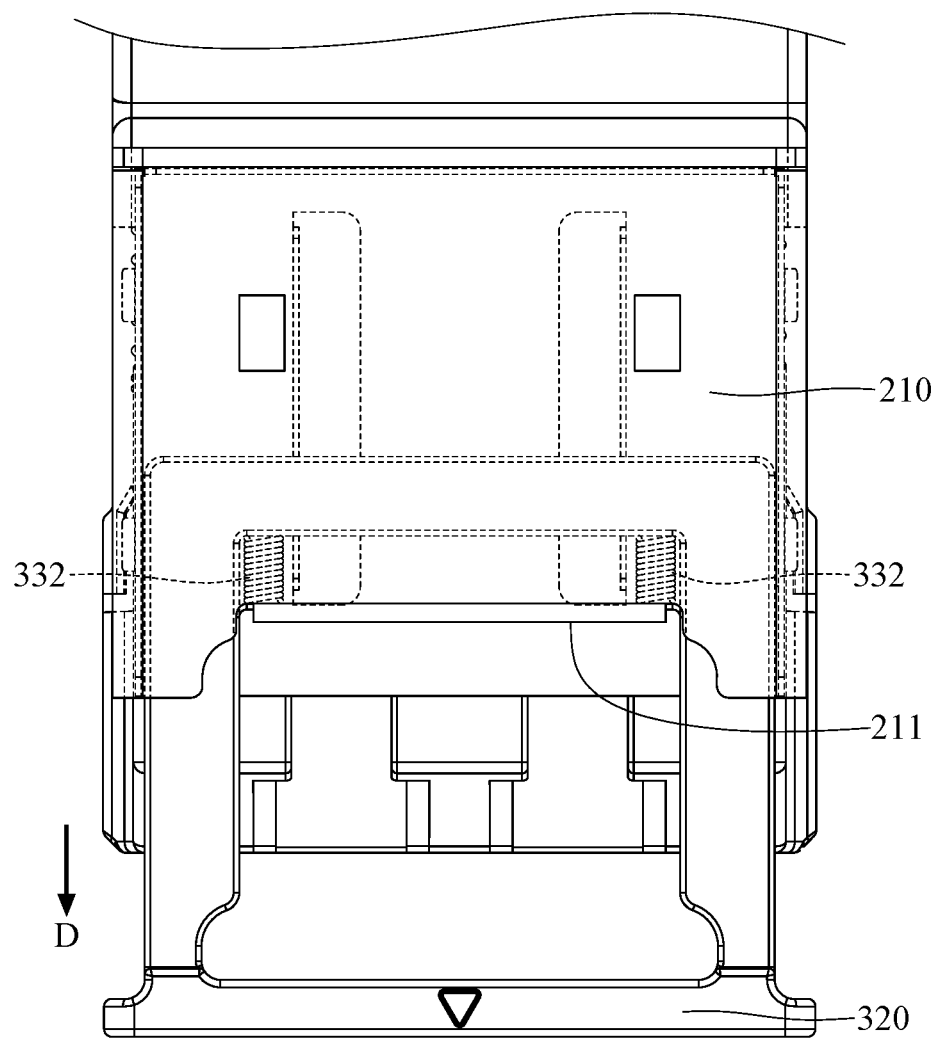
FIG. 12 is a schematic view of the optical transceiving device in FIG. 11, with a handle at opened position.

The release mechanism of the optical transceiving device in the first embodiment includes one or more elastic sheets which can be fastened with the handle, but the present disclosure is not limited thereto. Please refer to FIG. 10 through FIG. 12, FIG. 10 is an exploded view of an optical transceiving device according to a second embodiment of the present disclosure, FIG. 11 is a partially top view of the optical transceiving device in FIG. 10, and FIG. 12 is a schematic view of the optical transceiving device in FIG. 11. In this embodiment, an optical transceiving device 1b may include a housing 10, a fastening component 20, a bail assembly 30b and two elastic components 40. The housing 10, the fastening component 20 and the elastic component 40 may be similar compared with the first embodiment.

The bail assembly 30b may include a carrier 310, a handle 320 and a securing structure 330. The carrier 310 is fixed to the fastening component 20, and the carrier 310 and the extending arm 220 may jointly define an accommodation space 100 having an opening 101. The handle 320 may be movably disposed on the carrier 310, and the securing structure 330 may be located in the accommodation space 100. The securing structure 330 may include two elastic members 332 which are, for example, two compression springs. Opposite ends of each of the elastic members 332 might be in contact with the handle 320 and the pressed portion 211 of the fastening component 20 located at the opening 101, respectively. The securing structure 330 includes two elastic members 332 in this embodiment, while the present disclosure is not limited by the number of the elastic members 332.

As shown in FIG. 11, when the handle 320 is at the "close" position, the elastic members 332 may be between the backend of the handle 320 and the pressed portion 211. The elastic members 332 might keep the handle 320 normally at the "close" position by the elastic force itself. Under this condition, the elastic members 332 do not apply force on the handle 320, or just apply a small amount of force on the handle 320.

As shown in FIG. 12, when the handle 320 is moved from the "close" to the "open" position along the release direction D, the elastic members 332 may be compressed due to force exerted by the handle 320, thereby storing elastic potential energy. Since the handle 320 may indirectly abut against the pressed portion 211 of the fastening component 20 through the elastic members 332, pulling the handle 320 by the operator may cause the elastic members 332 to push the fastening component 20, thereby bringing the fastening component 20 to move together along the release direction D and thus unhooking the fastening component 20 from the cage. When the operator releases the handle 320, the aforementioned elastic potential energy stored in the elastic members 332 might be released to move the handle 320 back to the "close" position.

Figure 13:
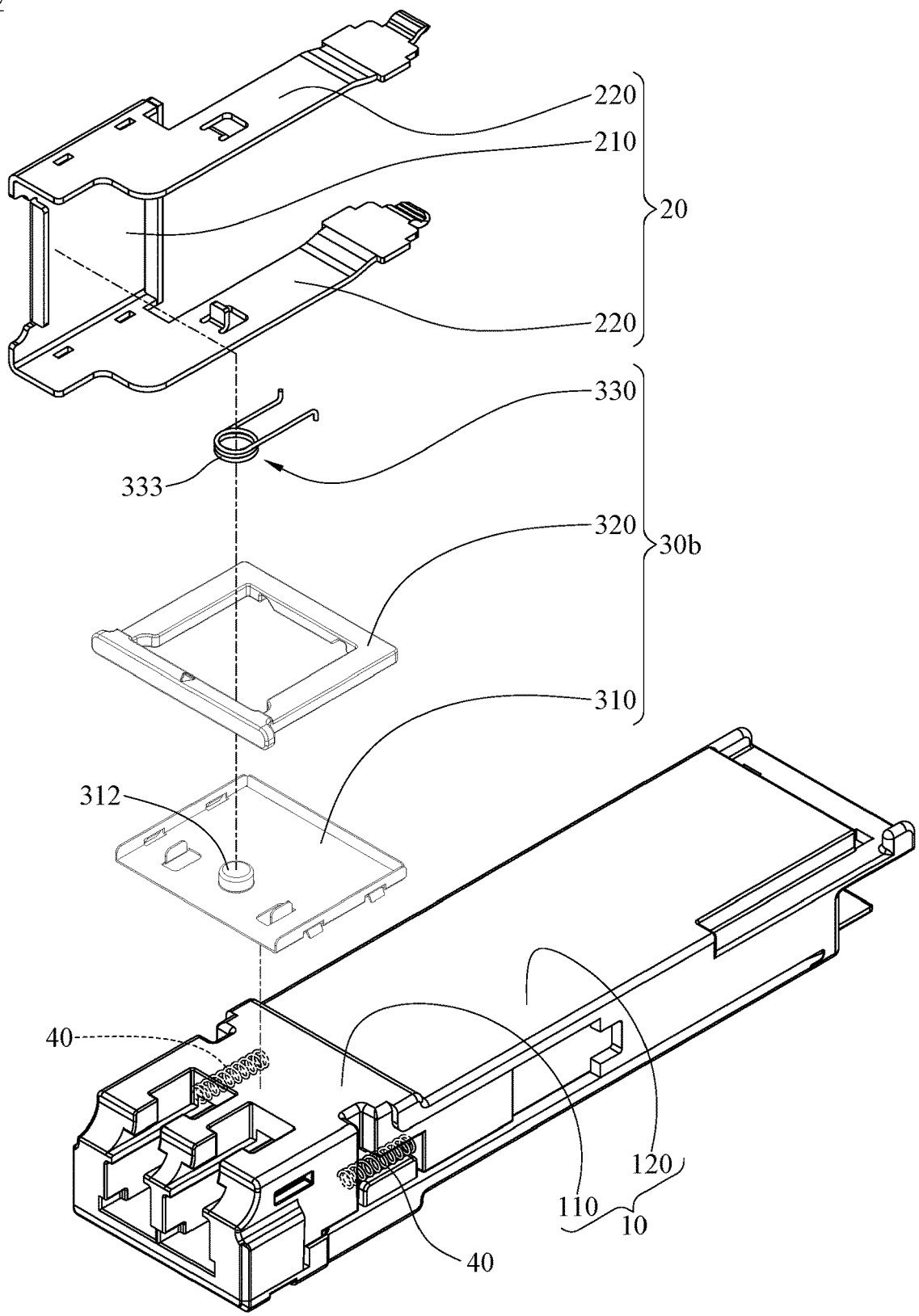
FIG. 13 is an exploded view of an optical transceiving device according to a third embodiment of the present disclosure.
Figure 14:
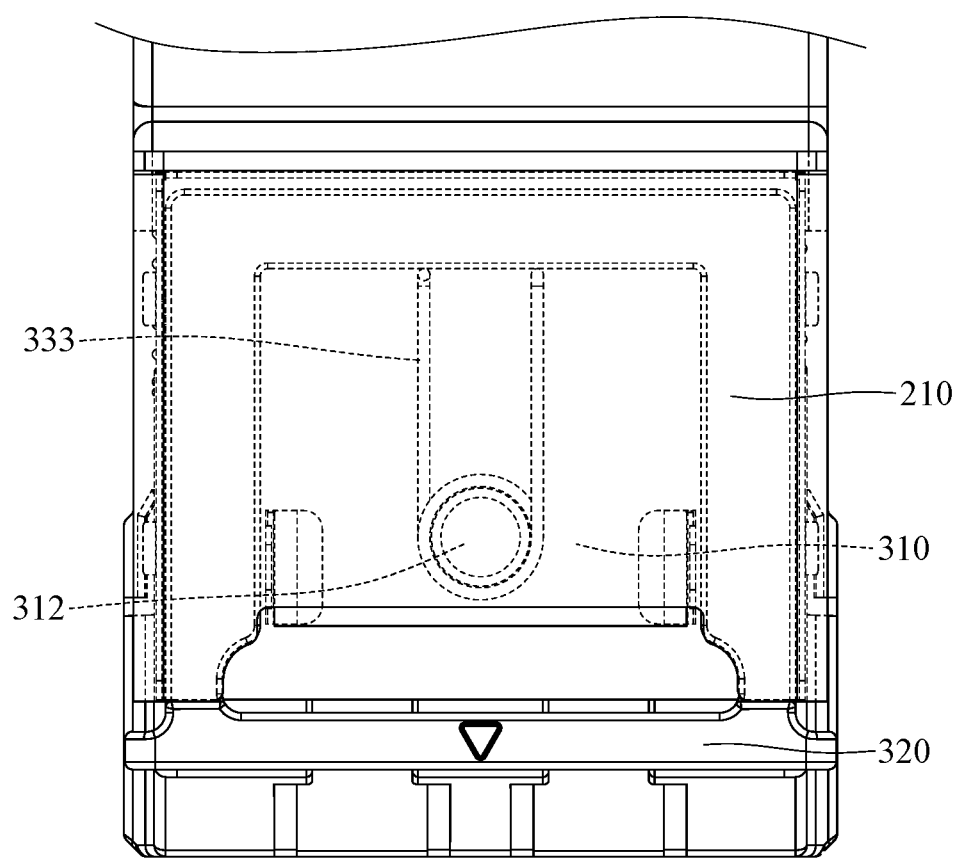
FIG. 14 is a partially top view of the optical transceiving device in FIG. 13.
Figure 15:
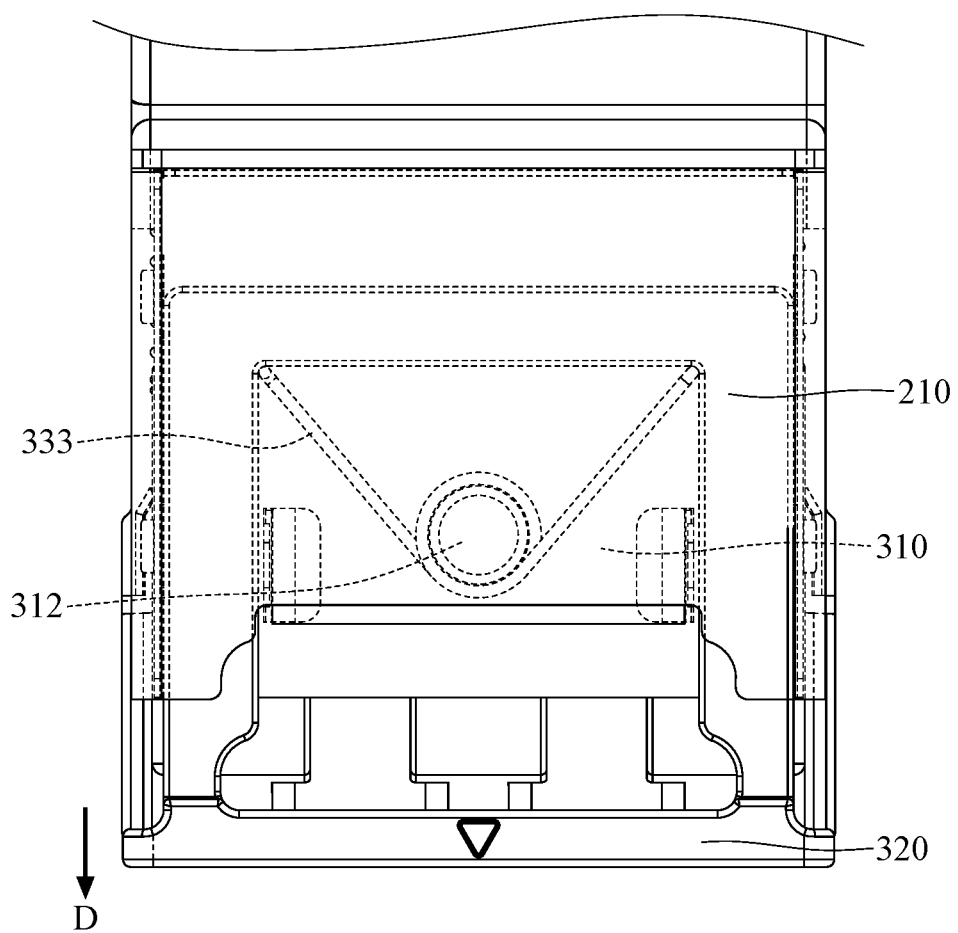
FIG. 15 is a schematic view of the optical transceiving device in FIG. 14, with a handle at opened position.

Referring to FIG. 13 through FIG. 15, FIG. 13 is an exploded view of an optical transceiving device according to a third embodiment of the present disclosure, FIG. 14 is a partially top view of the optical transceiving device in FIG. 13, and FIG. 15 is a schematic view of the optical transceiving device in FIG. 14. In this embodiment, an optical transceiving device 1c may include a housing 10, a fastening component 20, a bail assembly 30c and two elastic components 40. The housing 10, the fastening component 20 and the elastic component 40 can be referred to in the first embodiment, and any description about these elements will be omitted hereafter.

The bail assembly 30c may include a carrier 310, a handle 320 and a securing structure, and the securing structure may include an elastic member 333 which is, for example, a torsion spring. The carrier 310 may include a pressed portion 312 located in the accommodation space 100. The elastic member 333 (torsion spring) may include a metal ring sleeved around the pressed portion 312, and the legs of the elastic member 333 may extend to touch the backend of the handle 320.

As shown in FIG. 14, the elastic member 333 might be used to maintain the handle 320 at the "close" position. Under this condition, the elastic member 333 do not apply force on the handle 320, or just apply a small amount of force on the handle 320.

As shown in FIG. 15, when the handle 320 is moved from the "close" to the "open" position along the release direction D, the elastic member 333 may be compressed due to force exerted by the handle 320, thereby storing elastic potential energy. Since the handle 320 may indirectly abut against the pressed portion 312 of the carrier 310 through the elastic member 333, pulling the handle 320 by the operator may cause the elastic member 333 to push the carrier 310, thereby bringing the fastening component 20, fixed with the carrier 310, to move together along the release direction D and thus unhooking the fastening component 20 from the cage. When the operator releases the handle 320, the aforementioned elastic potential energy stored in the elastic member 333 might be used to move the handle 320 back to the "close" position.

According to the present disclosure, a bail assembly includes a handle movable with respect to a fastening component to be either at the predetermined "close" position or the "open" position. The handle when at its "close" position is kept in an accommodation space between the fastening component and a carrier. As such, the handle will not obstruct ports on the optical fiber terminal and optical fiber connectors inserted into the optical fiber terminal, which helps the operator to install and remove the optical fiber connector.

When at its "open" position, most of the handle might protrude from the opening of the accommodation space. Since the movement of the handle can move the fastening component together, the optical transceiving device could be moved from a cage. The release mechanism of the present disclosure could help ensure the handle would not be constantly obstructing the optical fiber terminal, which renders easier the insertion and removal of the optical fiber.

Moreover, since the handle can be kept in the accommodation space without obstructing the optical fiber terminal, the material made of the handle is of no issue. In other words, both the handle and the fastening component can be made of metal material, which helps reduce the manufacturing cost and actually expand the options available to the designer.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiving device, configured to be inserted into a cage in a pluggable manner, comprising:
   a housing comprising two lateral surfaces opposite to each other;
   a fastening component movably disposed within the housing, the fastening component comprising a linkage arm and two extending arms, the two extending arms respectively connected with opposite sides the linkage arm respectively, the two extending arms respectively disposed on the two lateral surfaces, and the two extending arms configured to be detachably fastened with the cage; and
   a bail assembly comprising a carrier, a handle and a securing structure, the carrier fixed to the fastening component, the carrier and the linkage arm jointly defining an accommodation space having an opening, the handle disposed above the carrier and movable along a release direction to be at either a close position or an open position, and the securing structure located in the accommodation space;
   wherein when the handle is at the close position, a first part of the handle is held in the accommodation space by the securing structure;
   wherein when the handle is at the open position, a second part of the handle protrudes from the opening of the accommodation space, and the handle brings the fastening component to move along the release direction.

2. The optical transceiving device according to claim 1, wherein the securing structure of the bail assembly comprises two elastic sheets formed on the carrier and extending towards the handle;
   wherein when the handle is at the close position, one of the two elastic sheets is hooked with a recess of the handle;
   wherein when the handle is at the open position, the other one of the two elastic sheets is hooked with the recess of the handle, and the handle abuts against the linkage arm of the fastening component.

3. The optical transceiving device according to claim 2, wherein the linkage arm of the fastening component comprises a pressed portion located at the opening of the accommodation space, and the handle abuts against the pressed portion when the handle is at the open position.

4. The optical transceiving device according to claim 1, wherein the carrier comprises a guiding rail, a confining groove of the handle is towards the carrier, and the guiding rail corresponds to the confining groove.

5. The optical transceiving device according to claim 1, wherein the securing structure of the bail assembly comprising an elastic member, the elastic member is compressed by the handle to store an elastic potential energy when the handle is moved along the release direction from the close position to the open position, and the handle is moved back to the closed position by the elastic potential energy.

6. The optical transceiving device according to claim 5, wherein the linkage arm of the fastening component comprises a pressed portion located at the opening of the accommodation space, opposite ends of the elastic member respectively touch the pressed portion and the handle, and the handle indirectly abuts against the pressed portion through the elastic member when the handle is at the open position.

7. The optical transceiving device according to claim 5, wherein the carrier of the bail assembly comprises a pressed portion located in the accommodation space, the elastic member is disposed around the pressed portion, and the handle indirectly abuts against the pressed portion through the elastic member when the handle is at the open position.

8. The optical transceiving device according to claim 1, wherein the linkage arm of the fastening component corresponds to a top surface of the housing, and the carrier of the bail assembly is located below the linkage arm.

9. The optical transceiving device according to claim 8, wherein the housing comprises a terminal portion and an insertion portion connected with each other, the insertion portion is configured to be inserted into the cage in the pluggable manner, and the terminal portion comprises the two lateral surfaces, the top surface and an optical fiber terminal.

10. The optical transceiving device according to claim 1, wherein an aperture of the handle has an area greater than or equal to 144 mm² when the handle is at the open position.

11. A release mechanism for optical transceiving device, comprising:
a fastening component; and
a bail assembly comprising a carrier, a handle and a securing structure, the carrier fixed to the fastening component, the carrier and the fastening component jointly defining an accommodation space having an opening, the handle disposed above the carrier and movable along a release direction to be at either a close position or an open position, and the securing structure located in the accommodation space;
wherein when the handle is at the close position, a first part of the handle is held in the accommodation space by the securing structure;
wherein when the handle is at the opened position, a second part of the handle protrudes from the opening of the accommodation space, and the handle brings the fastening component to move along the release direction.

12. The release mechanism for optical transceiving device according to claim 11, wherein the securing structure of the bail assembly comprises two elastic sheets formed on the carrier and extending towards the handle;
wherein when the handle is at the close position, one of the two elastic sheets is hooked with a recess of the handle;
wherein when the handle is at the open position, the other one of the two elastic sheets is hooked with the recess of the handle, and the handle abuts against the fastening component.

13. The release mechanism for optical transceiving device according to claim 11, wherein the securing structure of the bail assembly comprising an elastic member, the elastic member is compressed by the handle to store an elastic potential energy when the handle is moved along the release direction from the close position to the open position, and the handle is moved back to the close position by the elastic potential energy.

14. The release mechanism for optical transceiving device according to claim 13, wherein the fastening component comprises a pressed portion located at the opening of the accommodation space, opposite ends of the elastic member respectively touch the pressed portion and the handle, and the handle indirectly abuts against the pressed portion through the elastic member at the open position.

15. The release mechanism for optical transceiving device according to claim 13, wherein the carrier of the bail assembly comprises a pressed portion located in the accommodation space, the elastic member is disposed around the pressed portion, and the handle indirectly abuts against the pressed portion through the elastic member when the handle is at the open position.

* * * * *